US011226063B2

(12) United States Patent
Kármán et al.

(10) Patent No.: US 11,226,063 B2
(45) Date of Patent: Jan. 18, 2022

(54) TOP BRACKET FOR TRIPODS

(71) Applicants: Balázs Kármán, Zsombó (HU); László Novák, Balatonalmádi (HU)

(72) Inventors: Balázs Kármán, Zsombó (HU); László Novák, Balatonalmádi (HU)

(\*) Notice: Subject to any disclaimer, the term of this patent is extended or adjusted under 35 U.S.C. 154(b) by 5 days.

(21) Appl. No.: 16/465,139

(22) PCT Filed: Sep. 18, 2017

(86) PCT No.: PCT/HU2017/050038
§ 371 (c)(1),
(2) Date: May 29, 2019

(87) PCT Pub. No.: WO2018/100405
PCT Pub. Date: Jun. 7, 2018

(65) Prior Publication Data
US 2020/0080682 A1    Mar. 12, 2020

(30) Foreign Application Priority Data
Nov. 30, 2016 (HU) .................................. P1600650

(51) Int. Cl.
*F16M 11/16* (2006.01)
*F16M 11/04* (2006.01)
(52) U.S. Cl.
CPC ............ *F16M 11/04* (2013.01); *F16M 11/16* (2013.01); *F16M 2200/022* (2013.01)

(58) Field of Classification Search
CPC ........ F16M 11/04; F16M 11/02; F16M 11/08; F16M 11/16; F16M 11/20; F16M 2200/022; G03B 17/56; G03B 37/00; F16B 2/06
(Continued)

(56) References Cited

U.S. PATENT DOCUMENTS

| 362,384 | A | * | 5/1887 | Johnson | ............... | F16C 11/0661 |
| | | | | | | 248/181.2 |
| 5,178,352 | A | * | 1/1993 | Johnson | ................. | F16M 11/14 |
| | | | | | | 248/181.2 |

(Continued)

*Primary Examiner* — Nkeisha Smith
(74) *Attorney, Agent, or Firm* — Handal & Morofsky LLC; Anthony H. Handal; Izick Vizel

(57) ABSTRACT

A top bracket (10) for tripods provided with a center opening (22) and comprises respective leg supports (12, 13, 14), the opening (22) has a cylindrical upper section (27), and further comprises an adjustable fastening means that fixes the position of said top plate (30) when being inserted and allows removal of the top plate (30) when loosened, wherein a spherical cavity (29) is provided in the opening (22) starting under the cylindrical upper section (27) which has a height much smaller than the height of the cylindrical cavity (29) under it, and the diameter of the spherical cavity (29) increases under the cylindrical upper section (27) until at a central height region of the body (11) it takes the highest equatorial diameter (D) and narrows down in downward direction, and the opening (22) is designed to receive either the cylindrical top plate (30) with a cylindrical side surface at its upper part (31) or to receive a leveling support (40) that has a spherical side (43) that fits in the spherical cavity (29), and the top bracket (10) comprises a mechanism that allows insertion and removal of the leveling support (40) in the opening (22).

13 Claims, 3 Drawing Sheets

(58) Field of Classification Search
USPC ......... 248/177.1, 178.1, 181.1, 181.2, 187.1, 248/176.3
See application file for complete search history.

(56) References Cited

U.S. PATENT DOCUMENTS

| | | | | |
|---|---|---|---|---|
| 5,769,370 | A * | 6/1998 | Ashjaee | F16M 11/14 |
| | | | | 248/168 |
| 6,708,943 | B2 * | 3/2004 | Ursan | F16M 11/10 |
| | | | | 248/183.2 |
| 8,025,262 | B2 * | 9/2011 | Yamaguchi | F16M 11/14 |
| | | | | 248/181.2 |
| 8,418,973 | B2 * | 4/2013 | Liu | F16M 11/041 |
| | | | | 248/183.2 |
| 9,004,419 | B2 * | 4/2015 | Nakatani | F16M 11/126 |
| | | | | 248/178.1 |
| 10,612,719 | B2 * | 4/2020 | Li | F16M 11/16 |
| 10,626,912 | B2 * | 4/2020 | Karai | F16C 11/106 |
| 2003/0234327 | A1 * | 12/2003 | Nakatani | F16M 11/16 |
| | | | | 248/177.1 |
| 2007/0090237 | A1 * | 4/2007 | Hsu | F16M 11/16 |
| | | | | 248/178.1 |
| 2007/0152115 | A1 * | 7/2007 | Chou | F16M 11/242 |
| | | | | 248/181.1 |
| 2016/0116103 | A1 * | 4/2016 | Gabrielli | F16M 11/24 |
| | | | | 248/125.8 |
| 2017/0146891 | A1 * | 5/2017 | Chen | G03B 17/561 |
| 2018/0347743 | A1 * | 12/2018 | Piao | F16M 11/2014 |
| 2020/0292124 | A1 * | 9/2020 | Li | F16M 11/32 |

* cited by examiner

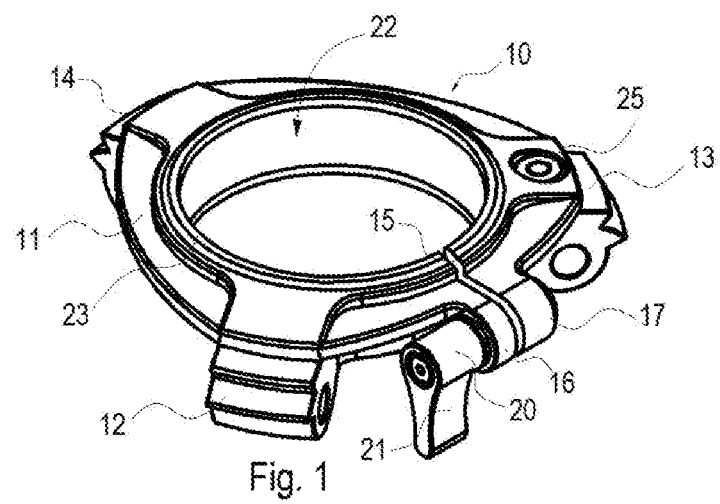
Fig. 1
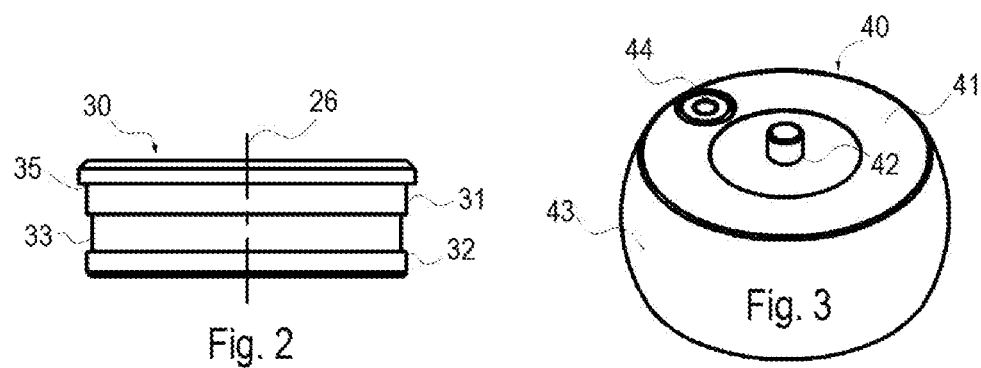
Fig. 2
Fig. 3
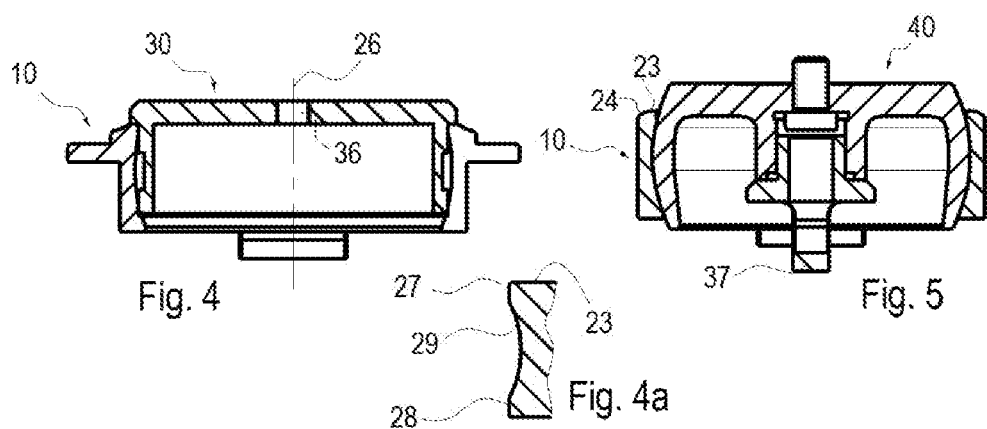
Fig. 4
Fig. 4a
Fig. 5

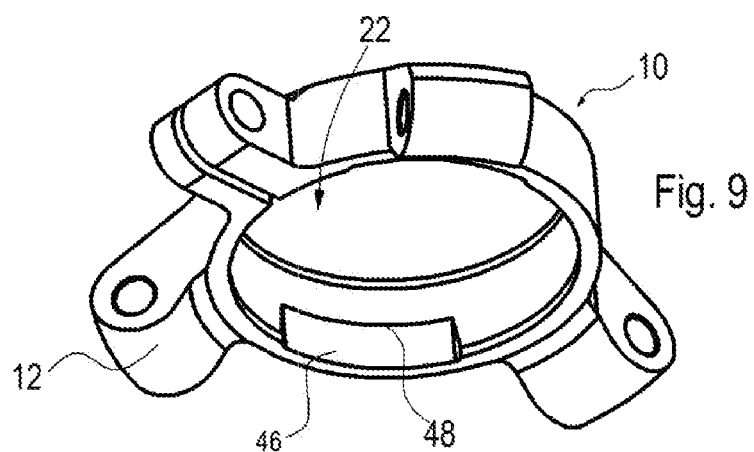
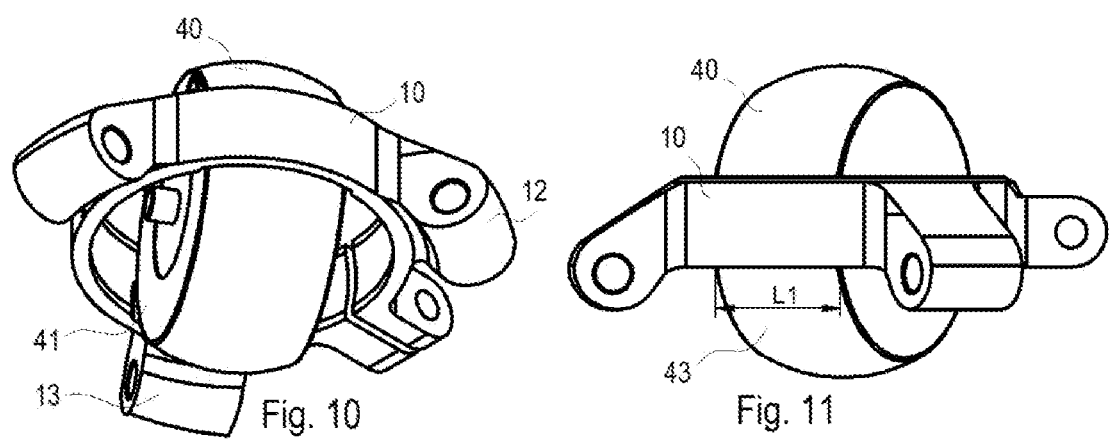
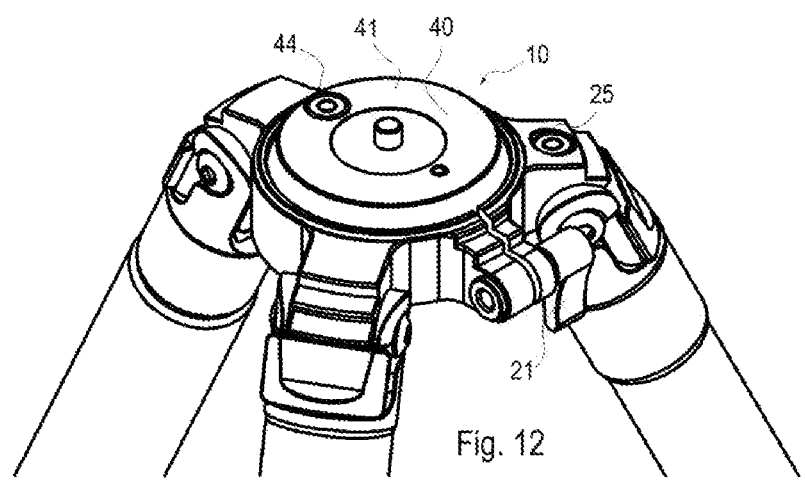

TOP BRACKET FOR TRIPODS

The invention relates to a top bracket for tripods used primarily for holding cameras, video recorders and other similar optical devices. The term "tripod" is the most commonly used expression for standers and supports used for optical devices both in the field and also in house applications. In the present specification the term tripod designates not only standers that have three adjustable legs i.e. which are tripods in the literary meaning of the term but all other devices which can be used as support.

A great variety of tripods are used in photography and they have an upper substantially circular bracket to which the three legs are fixed and these brackets have mostly a central opening in which a top plate or top platform can be fixed. The top plate is provided with more or less standardized support elements which provide releasable connection to a ballhead or to different connection means like an I-plate or L-plate to which the camera can be fixed in different positions. Owing to its special shape top brackets are often referred to as "spider" or "chassis".

The fastening and release of the top plate is solved generally by providing a narrow vertical gap across the top bracket, and using an adjusting bolt with a large button head to tighten thereby the gap or to allow the gap open under the effect of the flexibility of the material of the top bracket.

The inner wall of the central opening of the top bracket is generally cylindrical or cylindrical at least at the upper and lower end regions, and the upper surface adjacent the opening serves as a support for the top plate. The diameter of the cylindrical opening follows standard sizes, and sizes 70 and 85 mm in diameter are the most frequent but other diameters like 60 mm are also used.

Several types of tripods and accessories can be found at different manufacturer's websites, like http://www.gitzo.com/accessories-systematic or http://www.benroeu.com/products/photo-tripod-heads/.

For fastening and releasing the top plate in the opening of the top bracket it need not have a slot and a gap but the use of an adjustable pressing member can solve the same task. A tripod designed without a slot is published at the website https://shop.sirui.co.uk/products/770753 that shows the picture of the Sirui R-42133X reporter tripod in which the top bracket has no gap but a short adjustment bolt presses a curved member to the cylindrical side face of the top plate when inserted in the top bracket.

A different type of camera supports includes adjustable center columns which can be inserted and fixed in the top bracket, whereby the height of the camera can be adjusted. A special type of tripods with center column are called "leveling tripods", wherein a spherical member surrounds the center column, and in that case in the opening of the top bracket a spherical nest is provided. This nest co-operates with the spherical member around the center column, whereby the angular position of the column can be adjusted within a given range. Because in case of a sphere any upper or lower diameter is smaller than the equator, the insertion of the sphere in the nest requires disassembly of the bracket which can be made in specialized workshops only. With such leveling tripods the vertical position of the center column can be easily adjusted even if the top plane of the tripod is not horizontal.

German patent publication DE 1974274 shows an example of a leveling tripod with adjustable center column. The publication is silent about the way how the sphere can be inserted in the conforming nest.

There are several accessories that can be attached to the top plate which are capable of level adjustments. An example is shown in WO2014/195745 that relates to an adjustable ballhead and has a housing being an upright cylinder and the bottom of the housing can be connected to a top plate of a tripod. In the housing there is a cylindrical shell with an upper rim in which a leveling bubble is arranged. The shell can be adjusted in any position in the housing and the leveling bubble allows adjustment of the rim to the horizontal plane without regard the position of the top plate.

The use of a special shell with leveling properties could be spared if the top plate was designed as the top of a level adjusting sphere. In case the opening of the top bracket is not an upright cylinder, a number of standard top plates cannot be used to such tripods, therefore this would limit the different uses of such a tripod.

Assuming that one wishes to place a top plate with spherical side walls in the top bracket of the tripod, a problem arises, namely the differences in the upper/lower and the central diameter (equator) of the sphere is substantial (can be 1.5 to 3 mm) and the gap cannot be opened to that extent. For fastening and releasing the object placed in the central opening a small tangential displacement e.g. a few tenth of a millimeter is required.

The task of the present invention is to provide a universal tripod top bracket in which a standard top plate with cylindrical side surface can be inserted, fixed and in case of need it can be removed, and a leveling support with a spherical side surface can be inserted therein to enable leveling.

This task has been solved by the tripod top bracket designed as defined in the attached claims.

The invention will now be described in connection with preferable embodiments thereof, in which reference will be made to the accompanying drawings. In the drawing:

FIG. 1 shows the perspective view of the top bracket according to the invention;

FIG. 2 shows the elevation view of a top plate 30 that can be inserted in the top bracket;

FIG. 3 shows the perspective view of a leveling support 40 for use in the top bracket;

FIG. 4 shows the elevation sectional view of the top bracket with the top plate 30 inserted therein;

FIG. 4a is an enlarge sectional detail of the profile of the opening 22;

FIG. 5 is similar to FIG. 4 but here the leveling support 40 is inserted in the opening 22;

FIG. 9 is a perspective view of the second embodiment of the top bracket viewed from the bottom;

FIG. 10 is a perspective view illustrating the insertion of the leveling support in the opening;

FIG. 11 is a similar view to FIG. 10 showing the last position of insertion of the leveling support; and FIG. 12 is a perspective view of the top bracket with the leveling support inserted.

Figure 6:
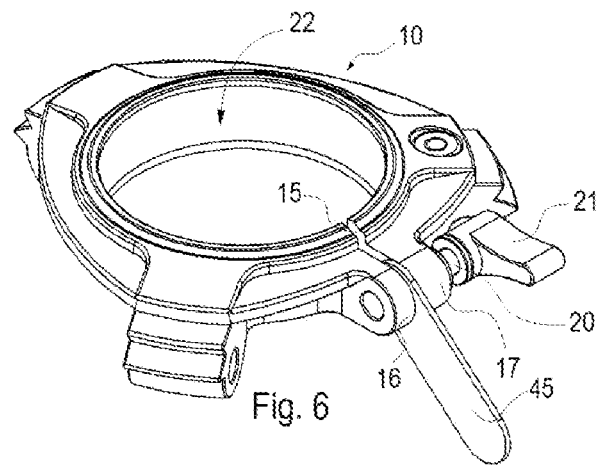
FIG. 6 is a perspective view of the top bracket 10 showing a way of widening the gap 15.
Figure 7:
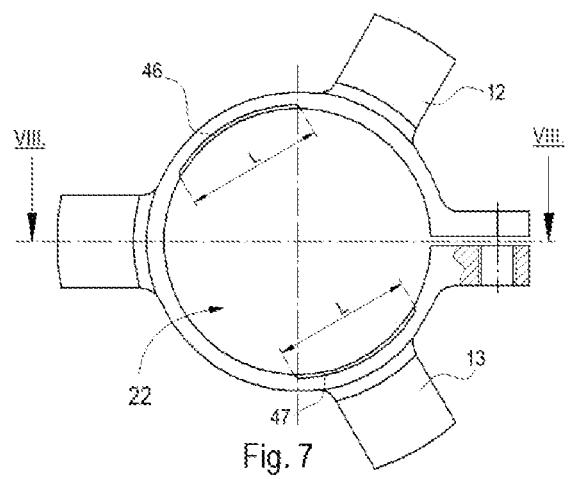
FIG. 7 is a bottom view of a second embodiment of the top bracket.

FIG. 1 shows the perspective view of a first embodiment of the top bracket 10 designed according to the present invention which has a flat body 11 made preferably of a cast aluminum alloy, and along its outer portion three radial projections as leg supports 12, 13 and 14 are provided which serve as attachment to the upper ends of the three legs of the tripod (not shown). The leg supports 12 to 14 are angularly offset from each other by 120°. The connection to the legs is provided through respective horizontal through bores in the leg supports 12-14. Opposite to the leg support 14 a narrow vertical gap 15 is provided across the body 11 and at the two faces of the gap the otherwise circular body has two radially extending projections 16, 17 and respective tangential bores are provided in them. One of the bores has an inner thread in which a threaded adjustment bolt 20 can be turned. At the head of the bolt 20 an elongated adjustment button 21 is provided whereby the width of the gap 15 can be adjusted. The body has a central opening 22 which is symmetrical to the central vertical axis of the body 11. Around the upper end of the opening a narrow horizontal ring 23 is provided on the top surface of the body 11, and beyond the ring 23 the upper surface of the body has a conical portion 24.

In the upper part of the leg support 13 a small circular leveling bubble 25 is arranged by which the leveling of the tripod can be checked, if one wishes to level the upper plane of the top bracket 10 adjust to horizontal position.

The design of the interior surface of the opening 22 is very essential from the point of view of the present invention and will be explained in detail.

FIG. 2 shows a cylindrical top plate 30 which has a more or less standard cylindrical shape around a vertical axis 26. The top plate 30 has a cylindrical body that has an upper and a lower part 31, 32, and a step 33 with smaller diameter is provided between the two parts 31, 32. Above the upper part 31 the top plate has a flat head which has a rim 35 with a diameter larger than that of the upper part 31, and the lower ring-like surface of the rim 35 provides a definite abutment and support for the top plate 30 when inserted in the opening 22 of the top bracket. When the top plate 30 is inserted in the opening 22 of the top bracket 10 (see FIG. 4) the cylindrical upper and lower parts 31, 32 of the top plate 30 are guided and held by an upper and lower cylindrical portion of the opening, and the rim 35 sits on and supported by the ring 23. The top plate has a central vertical threaded bore 36 for connection to a ball head or different accessories required for holding a camera (not shown). In FIG. 3 a leveling support 40 is shown in perspective view, which has a flat upper surface 41 and a threaded central bolt 42 which has the task of providing a releasable connection to the device held by the leveling support 40. The leveling support 40 has a spherical side 43 and this allows adjusting the angle of inclination of the upper surface 41. In use the leveling support 40 should be inserted and fitted in the central opening 22 of the top bracket 10. In the upper surface 41 a leveling bubble 44 is arranged that is used to adjust the horizontal position of the leveling support 40.

Reference is made now to FIGS. 4 and 4a. FIG. 4 shows a simplified sectional view of the top bracket 10 when the top plate 30 is inserted and fitted in the central opening 22. FIG. 4a shows the enlarged profile of the opening 22. The opening 22 has a cylindrical upper section 27 and a spaced cylindrical lower section 28 and a spherical cavity 29 that extends between the upper and lower sections 27, 28. The upper section 27 has the same diameter as that of the upper part 31 of the top plate 30 and its height can be smaller but in any case sufficient for squeezing and holding the top plate 30 when the gap 15 is tightened. It is advantageous but not always necessary that the lower cylindrical section 28 has the same diameter as the lower part 32 of the top plate 30, but in such a design the positioning of the top plate 30 in the opening 22 is more definite. The lower cylindrical part 28 can even be omitted and the spherical cavity 29 can extend till the bottom face of the opening 22, since the support between the ring 23 on the top bracket 10 and the lower face of the rim 35 of the top plate 30 together with the matching diameters of the upper part 31 of the top plate 30 and the cylindrical upper section 27 of the top bracket 10 can provide a stable positioning of the top plate 30 in the top bracket 10.

FIG. 5 is a similar sectional view to FIG. 4 but here the leveling support 40 is inserted in the central opening 22 of the top bracket 10. The shape of the spherical cavity 29 in the opening 22 fits to the shape of the spherical side 43 of the leveling support 40. FIG. 5 shows also the inner design of the leveling support 40 wherein a screw projects out of a central bore that connects the devices held by the leveling support 40. A hook 37 project out from the bottom of the leveling support 40 that facilitates handling.

Figure 8:
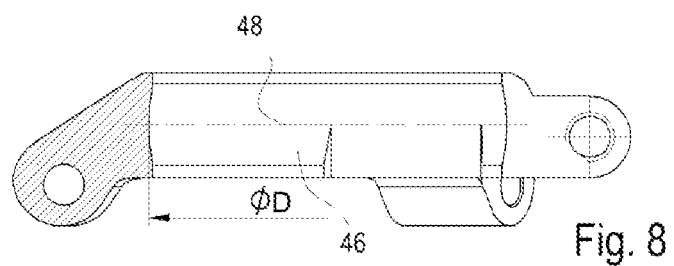
FIG. 8 is a section taken along line VIII-VIII of FIG. 7.

Reference is made now to FIG. 6 which shows a first way of placing the leveling support 40 with its spherical side 43 in the central opening 22 of the top bracket. The normal width of the gap 15 on the body 11 of the top bracket 10 is much smaller than the difference in the equatorial diameter D (shown in FIG. 8) of the spherical cavity 29 of the opening 22 and the diameter of the cylindrical upper section 27. The leveling support 40 can be inserted in the opening 22 if the gap 15 is increased to the extent to be able to receive the diameter D. FIG. 6 show that a flat plate 45 which can be a coin as well is inserted in the gap 15 after the bolt 20 has been removed from the threaded bore in the projection 16 so that the plate 45 covers the connection between the bores in the two projections 16, 17. Then the bolt 20 with its large button 21 is screwed from the other projection 16 in the threaded bore as shown in FIG. 6 as long as its inner end abuts the plate 45. When the bolt 20 is forced further in the same direction, the projection 16 is forced to open the gap 15, and this operation can be continued as the central opening 22 will be sufficiently wide to receive the leveling support 40. After this the bolt 20 can be loosen, whereby the flexibility of the material of the body 11 of the top bracket 10 closes the gap, and that fixes the leveling support 40 in the spherical cavity 29. Then the plate 45 can be removed, and the bolt 20 can be removed and inserted in the bore of the other projection 17 as shown in FIG. 1, and by tightening the bolt 21 the position of the leveling support 40 can be fixed. This operation requires that the material of the alloy from which the top bracket 10 is made has a sufficient extent of flexibility. Using the aforementioned standard diameters of the opening 22 this condition can be fulfilled with several alloy materials, however, a few preferred alloy compositions for this purpose are the AlZn5Mg3Cu (that has a type name EN AW 7022—and a commercial name: CERTAL) and the composition AlZn5,5MgCu (having the type name: EN AW 7075—and commercial name PERUNAL).

While the here described way of forced opening the gap 15 provides a solution to allow insertion of the leveling support 40 in the central opening 22, this is connected with some additional effort. In FIGS. 7 to 11 a different way is shown that allows easy and fast insertion of the leveling support 40 in the top bracket 10. In the bottom view of FIG. 7 that shows the top bracket 10 from below it is shown that the previously described design of the central opening 22 has a pair of diametrically opposite and identical cuts 46, 47 which have a width L. The cuts 46, 47 have a cylindrical surface and the diameter of the cylinder corresponds to the equatorial diameter D of the spherical cavity 29. It is preferred if the cuts 46, 47 extend only till the halving plane 48 of the spherical cavity 29 illustrated by the chain line in FIG. 8. The width L is at least as high as the height L1 of the leveling support where its outer diameter is the same as the diameter of the cylindrical upper section 27 of the opening 22 (see FIG. 4a) and illustrated by a thin line on FIG. 11. To find the position of the cuts 46, 47 it is preferred if they are symmetrically arranged to one of the three leg supports 12 to 14. In FIG. 9 they are position symmetrically to the leg support 13.

FIG. 9 shows the perspective view of the top bracket 10 view from the bottom. The insertion of the leveling support 40 in the opening 22 of this embodiment is illustrated in FIGS. 10 and 11. The leveling support 40 has to be turned by 90° so that the upper surface 41 which is normally horizontal should become vertical, and in this position the leveling support 40 has to be inserted in the opening from below where the cuts 46, 47 are provided. This can be easily recognized from the position of the leg support 13. FIG. 10 shows the initial position of the insertion. FIG. 11 shows when the leveling support 40 is in central position within the opening. At this central position the leveling support 40 should be turned by 90° so that its upper surface 41 becomes again horizontal and faces upward. This turning movement can be done easily, as the presence of the cuts 46, 47 has removed all parts which would prevent such a rotation. In the moment the leveling support 40 has been turned, the spherical side 43 thereof fits in the spherical cavity 29 of the opening 22 and the leveling support 40 can now be turned in any position.

The removal of the leveling support 40 occurs in reverse direction, and when it has been removed the top plate 30 with cylindrical side surfaces can be inserted.

FIG. 12 is a perspective view showing the top bracket 10 holding the leveling support 40 in the opening 22. The upper surface 41 of the leveling support 40 is higher than the upper surface of the top bracket 10 because in that case any accessory connected place on the upper surface will not get abutted to the top bracket 10 even if the plane of the upper surface 41 is inclined to the upper plane of the top bracket 10. In this way after the tripod has been positioned anywhere in the field and its upper surface is not quite horizontal, by loosening the bolt 20 the leveling support 41 can be adjusted easily so that its upper surface 41 becomes horizontal. This is made possible by the presence of the leveling bubble 44 in the leveling support 40.

The adjusted position can be fixed by tightening the bolt 20. In the embodiment there is no need to provide the gap 15 because a continuous top bracket design is possible; where the fixing of the inserted leveling support 40 can take place by a lateral pressure means like in case of the previously mentioned Sirui reporter studio tripod type R-4213X.

The top bracket 10 designed according to the present invention is very similar to conventional top brackets, however owing to the special design of the interior of the central opening 22, it can receive and fix standard top plates with cylindrical side surface, and after removal of the top plate one can insert the leveling support 40 which performs the same function as the top plate but allows easy, simple and fast leveling rendering the use of expensive and large leveling systems unnecessary.

Of course, the leveling support 40 can be designed to hold a central column in the middle, which can have adjustable height, whereby the function of a leveling tripod can be provided. The difference with conventional leveling tripods with central column lies in, that in the present case the central spherical support can be removed easily by the user, and the same tripod can hold a standard top plate 30 or if he prefers the leveling support 40.

The invention claimed is:

1. A top bracket for tripods having a substantially flat body having a top and a bottom face and provided with a center opening between said top and bottom faces and wherein said substantially flat body further comprises an outer region comprising respective leg supports angularly spaced from each other, the opening has a symmetric design around a central axis and a cylindrical upper section for receiving and holding a cylindrical top plate when inserted therein, said cylindrical upper section and said cylindrical top plate have respective fitting diameters, said opening has a height measured parallel to the central axis, said cylindrical upper section has a height smaller than the height of said opening, and an adjustable fastening means that fixes said cylindrical top plate in position when inserted in said opening and allows removal of the cylindrical top plate when loosened, wherein a spherical cavity is provided in the opening starting under the cylindrical upper section wherein the spherical cavity has a height measured along the central axis greater than the height of the cylindrical upper section and the spherical cavity has changing diameters measured normal to the central axis which increase in a downward direction under the cylindrical upper section until a central height region of the spherical cavity, a diameter of the central height region having a highest value which is substantially equal to a diameter of the spherical cavity taken in an equatorial plane, and said spherical cavity changing diameters decreases from said highest value in a downward direction until reaching substantially a diameter equivalent to the diameter of the cylindrical top plate, and the opening is designed to receive either the cylindrical top plate or to receive a leveling support that has a spherical side that fits in the spherical cavity, and the top bracket comprises a mechanism that allows insertion and removal of the leveling support in the opening.

2. The top bracket as claimed in claim 1, wherein the opening has a short cylindrical lower section extending under a lower end of the spherical cavity and reaching till the lower face of the body, wherein the short cylindrical lower section has a diameter equal to said diameter of the cylindrical upper section.

3. The top bracket as claimed in claim 1, wherein the adjustable fastening means comprises a narrow gap having an adjustable width and extending across the body, and the body has respective radial projections at both sides of the gap comprising respective bores extending tangentially with respect to the opening, a threaded nut is provided in one of the bores, and a bolt inserted in the bores to adjust the width of the gap.

4. The top bracket as claimed in claim 3, wherein said mechanism comprises said bolt when inserted in the bore provided with the threaded nut, and plate inserted temporarily in the gap for abutment with an inner end of the bolt, whereby turning the bolt in the threaded nut past abutment with the flat plate forces the gap to open, and the body of the top bracket has a sufficient resilience to allow opening of the gap until the leveling support can be inserted in the opening.

5. The top bracket as claimed in claim 4, wherein said body is an aluminum alloy made of AlZn5Mg3Cu or AlZn5, 5MgCu.

6. The top bracket as claimed in claim 1, wherein a pair of diametrically opposing cylindrical cuts are provided in the opening that extend from one face of the opening till the equatorial plane of the spherical cavity, wherein the cuts have an inner diameter corresponding to the diameter of the spherical cavity taken in an equatorial plane and the cuts have equal widths measured normal to the central axis being at least as long as a height of the leveling support substantially equal to the diameter of said opening at said one face.

7. The top bracket as claimed in claim 6, wherein the cuts start at the bottom face of the body.

8. The top bracket as claimed in claim 6, wherein the adjustable fastening means comprises a narrow gap having an adjustable width and provided across the body, and the body has respective radial projections at both sides of the gap comprising respective bores extending tangentially with respect to the opening, a threaded nut is provided in one of the bores, and a bolt inserted in the bores to adjust the width of the gap, the cuts are provided opposite to one of the leg supports which are adjacent to the gap.

9. The top bracket as claimed in claim 1, wherein a leveling bubble is arranged on the leveling support.

10. The top bracket as claimed in claim 2, wherein the equal diameter of the cylindrical upper and lower sections of the opening corresponds to an outer diameter of standard top plates being 85, 70 or 60 mm.

11. The top bracket as claimed in claim 1, wherein the top face of the body around an upper end of the opening has a surface portion providing support for a rim of the cylindrical top plate when inserted in and kept by the opening.

12. A top bracket for tripods comprising:
a substantially flat body having a top and a bottom face and provided with a center opening between said top and bottom faces, the opening having a symmetric design around a central axis and having a height measured parallel to the central axis
said body further comprising:
leg supports angularly spaced from each other arranged at an outer region of said body,
an adjustable fastening means that changes a size of said opening, comprising:
a leveling support that has a substantially flat upper surface and a spherical side and a height measured normal to the flat upper surface,
a connector provided on the leveling support for holding a device to be mounted on a tripod; wherein
a spherical cavity provided in the opening with a size fitting to said spherical side of the leveling support and having a top and a bottom opening, the spherical cavity having an axis of symmetry falling on said central axis and the spherical cavity having changing diameters measured normal to the central axis which diameter starting from the top opening increases in downward direction until at a central height region of the spherical cavity, a diameter of the central height region takes the highest value which is substantially equal to an equatorial diameter of the spherical cavity taken in an equatorial plane, and said changing diameters measured normal to the central axis decreases in the downward direction from the central height to the bottom opening,
a pair of diametrically opposing cylindrical cuts being provided in the center opening that extends from one face of the flat body to the equatorial plane of the spherical cavity and having an axis substantially equal to the central axis, wherein the cylindrical cuts have an inner diameter corresponding to the equatorial diameter of the spherical cavity and the cuts have equal widths measured normal to the central axis and being at least as long as a height of the leveling support, whereby the leveling support can be placed in the spherical cavity by being inserted in said opposing cuts when turned angularly so that the flat upper surface becomes parallel to the central axis, and following insertion the leveling support is turned again so that the flat upper surface is oriented transverse to the central axis and being caught in the spherical cavity.

13. The top bracket as claimed in claim 12, wherein the cuts start at the bottom face of the body.

\* \* \* \* \*